United States Patent Office 3,243,418
Patented Mar. 29, 1966

3,243,418
ETHYLENE/t-BUTYL AMINOETHYL METHACRY-
LATE COPOLYMERS AND COATINGS THEREOF
Robert P. Shouse, Tuscola, Clarence J. Vetter, Jr., Atwood, and William E. Daniel, Villa Grove, Ill., assignors to National Distillers and Chemical Corporation, New York, N.Y., a corporation of Virginia
No Drawing. Filed Feb. 28, 1963, Ser. No. 261,842
12 Claims. (Cl. 260—86.7)

This invention relates to the manufacture of copolymers of ethylene. It is particularly concerned with copolymers of ethylene that have good adhesion to a wide variety of substrates. More particularly, the invention relates to the manufacture of copolymers of ethylene with t-butyl aminoethyl methacrylate that are especially suited for use as a coating for both porous and non-porous substrates.

When ethylene polymers are to be used as coating materials, it is important that the product have, among other characteristics, outstanding mechanical properties. The product must have, for example, low modulus of elasticity, high stress crack resistance, and high elongation. It is also important that the product have good adhesion, flow characteristics, flexibility, and processability; good heat sealing properties; minimum polymer build-up at the die and minimum neck-in (to be defined hereinafter) when the coating is applied by extrusion; and minimum odor and smoking during extrusion.

It is known that ethylene can be polymerized with methacrylate esters to produce a wide variety of copolymers. In general, however, the resulting copolymers have not shown any improvement over polyethylene itself, and in many cases they have not been useful.

It is an object of this invention to provide a process whereby a polyethylene copolymer product can be obtained using the apparatus and techniques already in commercial practice for large-scale production of polyethylene.

It is another object of this invention to provide copolymers of ethylene that have improved mechanical properties.

Another object of the invention is to provide a combination of reactants, reaction conditions, and reaction-influencing substances that gives results in a high pressure process that are quite different from results previously achieved in high pressure polymerization.

Additional objects and advantages will become apparent from the following detailed description:

It has now been found that a resin product having a combination of properties that make it particularly suited for use as a coating for a variety of porous and non-porous substrates, e.g., paper, cellophane, aluminum foil, glass fabrics, cloth, paperboard, and the like can be prepared by subjecting ethylene in admixture with a small amount for example between about 0.5 and about 5.0 weight percent, based on ethylene feed, of t-butyl aminoethyl methacrylate as a comonomer to selected polymerization conditions of elevated temperature and elevated pressure in the presence of a suitable catalyst and, if desired, a suitable catalyst carrier.

The resulting desired copolymer has a density of about 0.915 to 0.935, a melt index of about 0.5 to 20, good processing and mechanical properties, and, in addition, a reactive amine group that makes the copolymer particularly attractive for such applications as coating paper or other materials, a laminant for joining two similar or dissimilar materials such as paper and foil, and the like.

The copolymers produced in accordance with this invention have thus acquired improved processing and mechanical properties without detrimental effect on their other physical properties that make them particularly applicable for use in coating applications. For example, the product is an easily-handled, good-working resin. Smoke and odor have been substantially eliminated with the resin, as has polymer build-up at the die. The heat sealing properties of substrate coatings made with these resins compare favorably with those of comparable resins prepared in the usual commercial manner. In addition, "neck-in" is reduced to a minimum at high extrusion coating temperatures. (Neck-in is defined as the tendency of the edges of the melt film to "neck" inward, due in part to the elasticity of the hot polymer. Unless the edges are trimmed, resulting in increased loss of material and/or reduction of usable web width, these thickened edges of the melt stream are carried onto the substrate as "beads." As the coated substrate is rolled up, its weight is supported by the beads at each side; this results in a a soft roll that sags in the middle and tends to break the substrate at the edges. Thus reduced neck-in is a definite advantage in resins to be used in applications such as extrusion coatings.)

The amount of the t-butyl aminoethyl methacrylate comonomer used can vary from about 0.5 up to about 5 weight percent, based on the ethylene feed; preferably about 0.5 to about 1.0 weight percent is used.

The catalyst selected for the process of this invention can be any ethylene copolymerization catalyst suitable for use under the reaction conditions embodied herein. Particularly suitable are dilauroyl peroxide, t-butyl perpivalate, t-butyl perbenzoate, t-butyl peracetate, t-butyl peroxide, and other compounds of comparable free radical activity, and mixtures thereof. The amount of catalyst employed can vary over a wide range of from about 0.001 up to about 5 weight percent, based on the ethylene feed. The catalyst can be used alone or it can be used in the presence of a catalyst carrier, that is, an inert liquid solvent or diluent such as, for example, benzene, hydrocarbon oils such as mineral oils, kerosenes, saturated hydrocarbons, and the like, and mixtures thereof. The amount of catalyst carrier can range from about 0 up to about 100 weight percent, based on the catalyst solution, and is preferably used in an amount of from about 80 to 99 percent.

As set forth above, the process in accordance with the present invention is carried out at conditions used in the high pressure polymerization of ethylene to prepare high molecular weight polymers. In general, the ethylene admixed with the t-butyl aminoethyl methacrylate comonomer is compressed by multi-stage compressors up to the operating pressure in the polymerization reactor. The catalyst with or without a catalyst carrier and with other additives, if desired, such as for example up to about 5.0 percent by weight, based on the catalyst carrier, of an antioxidant, are injected into the polymerization reactor. In the polymerization reactor the ethylene and the comonomer are copolymerized to form a solid or semi-solid copolymer under pressures within the range of about 12,000 to about 35,000 pounds per square inch, and preferably about 17,000 to about 25,000 pounds per square inch, and at a temperature within the range of about 250° to 500° F., and preferably about 350° to 450° F. The product copolymer and the unreacted gas are then passed through pressure let-down valves into gas separators, which may be one or more in series. The unreacted gas is separated and recycled, if desired, to the ethylene feed line. The copolymer product remaining in the final gas separator is extruded, cooled to room temperature, and subjected to conventional after-treatment steps, such as chopping, shredding, reprocessing, blending, Banburying, or the like.

In order to get the preferred copolymer product, it is essential both that the pressure be in the range of about 12,000 to 35,000 p.s.i. and that the temperature be within the range of about 250° to 500° F. If the pressure is substantially below 12,000 p.s.i. or substantially above 35,000 p.s.i. or if the temperature is substantially below 250° F. or substantially above 500° F., the resulting copolymer does not have the desired combination of properties.

The relative ease with which this improved polymerization process can be carried out is an obvious advantage. As previously stated, there is no need to employ special equipment or reaction techniques in practising the inventive method. Single-stage or multi-stage processes may be utilized, and the polymerization may be carried out as a bulk polymerization or in the presence of solvents, such as benzene, or of dispersants, such as water. The pressure attained may be achieved as usual by pressuring the reactor to the desired degree with ethylene. It will be understood that the usual polymer recovery processes are applicable to the method of this invention; for example, the unreacted ethylene and comonomer may be separated from the molten copolymer in a vessel in which the temperature is essentially that of the reaction and the pressure is reduced to about one tenth that of the reaction. The pressure of the copolymer may be further reduced to about 0 to 10 p.s.i., and the molten copolymer may then be extruded, cooled, and pelletized.

The copolymer of this invention may be molded or converted to a film by any convenient procedure. The film may be blown, flat, or cast. Films may be formed in thicknesses ranging in gauge from about 0.5 mil, suitable for use are garment bags, up to about 10 mils, suitable for use as tarpaulins.

The copolymer may also be used to improve the properties of waxes such as petroleum-derived waxes, either microcrystalline or paraffin, synthetic waxes, etc. Such compositions are expected to have improved properties of toughness, scuff resistance, adhesive strength, ductility, gloss, low water vapor transmission, and processability. The amount of ethylene copolymer blended with the wax may vary over a wide range so that such compositions are useful, for example as (1) coatings, e.g., for paper, cardboard, cloth, fiber, foil, plastics, e.g., polyolefins, rug backing, and the like; (2) moldings, e.g., molded food containers, disposable containers, etc.; (3) laminates, that is, for adhering various substrates together, such as aluminum to cellophane, aluminum to polyolefins, e.g., polypropylene, etc.

If desired, the copolymer of this invention may be used in finely-divided form, that is, where the copolymer has an average size of less than about 10 mesh and preferably within the range of about 150 to 2,000 microns. The finely-divided, or powdered, material may be used, for example, in dry form to coat articles by dip coating in either a static or fluidized bed, by powder coating wherein the powder is applied by spraying or dusting, and by flame spraying. In dispersed form, the powders may be applied as coatings by roller coating, spray coating, slush coating, and dip coating to a variety of substrates. The powder also may be foamed and/or used in powder molding techniques; as a paper pulp additive; a mold release agent for rubber; an additive to waxes, paints, or polishes; a binder for non-woven fabrics; and the like.

The finely-divided material may be prepared by mechanical grinding, by solution or dispersion techniques, or by any other convenient method.

The invention will be more fully understood by reference to the following examples which are not intended to limit the scope of the invention except as indicated by the appended claims. Unless otherwise specified, all parts are given by weight.

Then density of the product is determined, in gram/cc., by a hydrostatic method, that is, by weighing a sample of the copolymer at 23° C., first in air and then in kerosene (ASTM test method D792-60T).

Melt index describes the flow behavior of a product at a specified temperature and under a specified pressure. It is here determined (ASTM test method D1238-57T) by measuring the flow rate, expressed in grams/10 minutes, on extrusion through an orifice 0.0825 inch in diameter by 0.315 inch long under a pressure of 43.1 p.s.i. at 190° C.

The yield strength is the tensile stress, in pounds per square inch of cross-sectional area of the test specimen, at which the slope of a stress-strain curve first becomes zero (ASTM test method D638-60T).

Torsional stiffness, measured in accordance with ASTM test method D1043-51, is the value obtained by measuring the angular deflection occurring when the specimen is subjected to an applied torque.

The heat softening point (Vicat softening temperature) is the temperature at which the test specimen becomes too soft to withstand stresses and keep its shape. It is the temperature at which a flat-ended needle of 1 sq. mm. cross section under a load of 1 kg. penetrates 1 mm. into a specimen. The temperature of the sample is increased at a uniform rate (ASTM test method D1525-58T).

Stress crack resistance is determined as follows (ASTM test method D1693-60T): Bent specimens of the plastic having a controlled imperfection on one surface are exposed to the action of a surface-active agent. The proportion of the total number of specimens which crack in a given time is observed.

EXAMPLE I (A) Ethylene admixed with 0.636 percent by weight based on the ethylene feed, of t-butyl aminoethyl methacrylate as comonomer and 0.0328 percent by weight of t-butyl perpivalate, based on the ethylene feed, as catalyst were fed separately into a conventional autoclave reactor. The temperature inside of the reactor was 380° F., and the reactor pressure was maintained at 20,000 p.s.i. A solid copolymer was continuously produced.

Blown film (1.5 mils thick) of the copolymer was extruded at 325° F. on a 2-inch Egan extruder with a 16:1 L:D ratio and a 2.5:1 blow-up ratio. The extruder output was about 25 pounds per hour. Properties of the product are tabulated below.

Compression molded plaques for testing the mechanical properties of the copolymer were made on an Atlas press at 300° F. The plaques were cut into test specimens suitable for use on conventional instruments for measurements of mechanical properties. Properties of the product are tabulated below.

(B) The procedure of Example I (A) was repeated except that no comonomer was used. The properties of the comparative ethylene homopolymer are tabulated below.

EXAMPLE II (A) The procedure of Example I (A) was repeated except that the comonomer was 0.688 percent of t-butyl aminoethyl methacrylate and the catalyst was 0.034 percent of t-butyl perpivalate.

(B) The procedure of Example II (A) was repeated except that no comonomer was used. The properties of the comparative ethylene homopolymer are tabulated below.

Table

| | Results of Example | | | |
|---|---|---|---|---|
| | IA | IB | IIA | IIB |
| Density | 0.9258 | 0.9276 | 0.9254 | 0.9273 |
| Melt Index | 0.96 | 2.27 | 3.51 | 3.76 |
| Friction Factor | 0.55 | 0.58 | 1.00 | 0.58 |
| Haze, Percent | 78.6 | 17.5 | 55.5 | 12.9 |
| Gloss, Percent | 1.0 | 4.9 | 1.6 | 5.4 |
| Transmittance, Percent | 0.26 | 26.0 | 0.26 | 20.3 |
| Elmendorf Tear: | | | | |
|   MD [1] | 40 | 154 | 46 | 110 |
|   TD [1] | 44 | 97 | 66 | 98 |
| Dart Drop Impact, grams | 149 | 60 | 105 | 55 |
| Elongation, Percent | 567 | 470 | 606 | 504 |
| Yield Strength, p.s.i | 1,440 | 1,810 | 1,410 | 1,780 |
| Modulus, p.s.i | 19,900 | 31,600 | 18,500 | 32,900 |
| Torsional Stiffness, p.s.i | 20,600 | 42,700 | 18,800 | 46,800 |
| Low Temperature Brittleness, °C. at F50 | <−76 | <−76 | <−76 | <−76 |
| Stress Crack Resistance, Hours at F50 | 0.4 | <0.25 | <0.25 | <0.25 |
| Vicat Softening Point, °C | 92.9 | 103.1 | 91.3 | 104.3 |
| t-Butyl aminoethyl methacrylate content of polymer (IR analysis), percent | 2.04 | 0.00 | 2.34 | 0.00 |

[1] MD—Machine Direction; TD—Transverse Direction.

As can be seen from the tabulated data, the copolymers of the present invention are less stiff and have higher elongation and dart drop values and lower densities and strength properties than the comparative ethylene homopolymers made under the same reaction conditions.

EXAMPLE III

A thin film of resin prepared as described in Example I (A) was extruded onto a paperboard substrate and pressed onto it. The coated paperboard was formed, by heat sealing, into a container suitable for packaging fresh solid or liquid food, chemicals, fertilizers, and the like. The copolymer-coated paperboard package thus-formed had good flexibility even when kept under refrigeration; good heat sealability; high chemical inertness; and substantially no odor.

While there are above disclosed but a limited number of embodiments of the process of the invention herein presented, it is possible to produce still other embodiments without departing from the inventive concept hereing disclosed. It is desired, therefore, that only such limitations be imposed on the appended claims as are stated therein.

What is claimed is:

1. A process for copolymerizing ethylene and t-butyl aminoethyl methacrylate which comprises reacting a mixture of ethylene and about 0.5 to about 5.0 weight percent, based on the ethylene feed, of t-butyl aminoethyl methacrylate at a temperature between 250° and 500° F. and a pressure between about 12,000 and about 35,000 pounds per square inch in the presence of about 0.001 to about 5 weight percent, based on the ethylene feed, of a free radical copolymerization catalyst in a stirred closed reaction zone.

2. The process of claim 1 wherein the temperature is between about 350° and 450° F. and the pressure is between about 17,000 and 25,000 pounds per square inch.

3. A copolymer of ethylene and t-butyl aminoethyl methacrylate prepared by the process of claim 1.

4. A shaped article produced by molding a copolymer of ethylene and t-butyl aminoethyl methacrylate prepared by the process of claim 1.

5. A film prepared from a copolymer of ethylene and t-butyl aminoethyl methacrylate prepared by the process of claim 1.

6. An article of manufacture comprising a substrate having coated thereon a film of a copolymer of ethylene and t-butyl aminoethyl methacrylate prepared by the process of claim 1.

7. A process for copolymerizing ethylene and t-butyl aminoethyl methacrylate which comprises reacting a mixture of ethylene and about 0.5 to about 1.0 weight percent, based on the ethylene feed, of t-butyl aminoethyl methacrylate at a temperature between about 350° and 450° F. and a pressure between about 17,000 and 25,000 pounds per square inch in the presence of about 0.001 to about 5 weight percent, based on the ethylene feed, of a free radical copolymerization catalyst in a stirred closed reaction zone.

8. A copolymer of ethylene and t-butyl aminoethyl methacrylate prepared by the process of claim 7.

9. A shaped article produced by molding a copolymer of ethylene and t-butyl aminoethyl methacrylate prepared by the process of claim 7.

10. A film prepared from a copolymer of ethylene and t-butyl aminoethyl methacrylate prepared by the process of claim 7.

11. An article of manufacture comprising a substrate having coated thereon a film of a copolymer of ethylene and t-butyl aminoethyl methacrylate prepared by the process of claim 7.

12. A package formed by heat sealing an ethylene/t-butyl aminoethyl methacrylate copolymer-coated substrate, said coated substrate being prepared by extruding onto said substrate a film of a copolymer product prepared by the process of claim 7.

References Cited by the Examiner

UNITED STATES PATENTS

| 2,744,884 | 5/1956 | Benneville | 260—86.7 |
| 2,953,551 | 9/1960 | White | 260—86.7 |
| 3,067,147 | 12/1962 | Rubens et al. | 260—86.7 |
| 3,119,803 | 1/1964 | Horkowitz | 260—86.7 |

OTHER REFERENCES

Kresser: Polyethylene, Reinhold Pub. Corp. (1957), New York.

JOSEPH L. SCHOFER, *Primary Examiner.*

DONALD E. CZAJA, *Examiner.*

H. WONG, *Assistant Examiner.*